US012767172B2

(12) United States Patent
Song

(10) Patent No.: US 12,767,172 B2
(45) Date of Patent: Oct. 20, 2026

(54) AUTONOMOUS DRIVING VEHICLE AND CONTROL METHOD THEREOF

(71) Applicants: Hyundai Motor Company, Seoul (KR); Kia Corporation, Seoul (KR)

(72) Inventor: Jun Hyung Song, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 59 days.

(21) Appl. No.: 18/816,252

(22) Filed: Aug. 27, 2024

(65) Prior Publication Data

US 2025/0074460 A1 Mar. 6, 2025

(30) Foreign Application Priority Data

Aug. 31, 2023 (KR) ........................ 10-2023-0115314

(51) Int. Cl.

| | |
|---|---|
| ***B60W 60/00*** | (2020.01) |
| ***B60W 40/04*** | (2006.01) |
| ***B60W 40/06*** | (2012.01) |
| ***G06T 7/246*** | (2017.01) |
| ***G06V 20/58*** | (2022.01) |

(52) U.S. Cl.

CPC ....... *B60W 60/001* (2020.02); *B60W 2552/53* (2020.02); *B60W 2554/4041* (2020.02); *B60W 2554/4044* (2020.02); *B60W 2554/80* (2020.02); *B60W 2555/20* (2020.02)

(58) Field of Classification Search

CPC ........... B60W 60/001; B60W 2552/53; B60W 2554/4041; B60W 2554/4044; B60W 2554/80; B60W 2555/20; B60W 2420/408; B60W 60/00; B60W 40/04; B60W 40/06; B60W 2050/0022; B60W 2420/403; B60W 2554/40; B60W 2556/35; G06T 7/246; G06T 2207/30252; G06V 20/58; G06V 20/588; G06V 2201/08

USPC .......................................................... 701/28

See application file for complete search history.

(56) References Cited

U.S. PATENT DOCUMENTS

| | | | | |
|---|---|---|---|---|
| 11,629,973 B2 * | 4/2023 | Sung | G01C 21/3658 | 701/41 |
| 11,932,245 B2 * | 3/2024 | Pandita | G06V 20/588 | |
| 2010/0145575 A1 * | 6/2010 | Switkes | B62D 15/025 | 701/41 |
| 2016/0132705 A1 * | 5/2016 | Kovarik | G06K 7/10376 | 340/10.3 |
| 2018/0001766 A1 * | 1/2018 | McNew | G01C 21/3647 | |
| 2019/0227549 A1 * | 7/2019 | Hummelshøj | G06V 10/87 | |
| 2019/0347821 A1 * | 11/2019 | Stein | G06V 10/772 | |
| 2020/0264900 A1 * | 8/2020 | Cheriton | B60W 60/0011 | |

(Continued)

*Primary Examiner* — Tyler D Paige

(74) *Attorney, Agent, or Firm* — Slater Matsil, LLP

(57) ABSTRACT

A method of controlling an autonomous vehicle, according to an embodiment of the present disclosure, can be under control of the processor, and can include determining whether an actual lane line of a driving road is recognized by receiving sensing information from a plurality of sensors on the autonomous vehicle, initially recognizing a target vehicle driving behind the autonomous vehicle and on another lane based on a result of the determining, and secondly recognizing the target vehicle by varying priorities of the plurality of sensors based on an environment of the driving road on which the initially recognized target vehicle is driving.

20 Claims, 9 Drawing Sheets

(56) References Cited

U.S. PATENT DOCUMENTS

| | | | | |
|---|---|---|---|---|
| 2021/0209941 | A1* | 7/2021 | Maheshwari | G06V 20/588 |
| 2022/0204041 | A1* | 6/2022 | Oh | B60W 30/18154 |
| 2022/0412772 | A1* | 12/2022 | Rabani | G06V 20/588 |
| 2024/0010223 | A1* | 1/2024 | Fasola | G01S 13/931 |

* cited by examiner

| Target vehicle recognition priority | First sensor | Second sensor |
| --- | --- | --- |
| First environment (normal situation) | Longitudinal position and speed of target vehicle | Lateral position and heading angle of target vehicle |
| Second environment (dark road situation at night) | Longitudinal position and speed + lateral position and heading angle of target vehicle | Not used (target vehicle and lane-line recognition unavailable) |
| Third environment (situation with diffused reflection on road or heavy rain/snow) | Not used (target vehicle and lane-line recognition unavailable) | Lateral position and heading angle + longitudinal position and speed of target vehicle |

FIG. 4

| Classification | | First sensor | Second sensor | Assign weight based on sensor accuracy |
|---|---|---|---|---|
| Longitudinal direction | Accuracy | a | b | ((a*10) + (b*15)) / (a+b) |
| | (ex) measured distance | 10 | 15 | |
| Lateral direction | Accuracy | c | d | ((c*4) + (d*3)) / (c+d) |
| | (ex) measured distance | 4 | 3 | |

FIG. 6

AUTONOMOUS DRIVING VEHICLE AND CONTROL METHOD THEREOF

CROSS-REFERENCE TO RELATED APPLICATIONS

This application claims the benefit of Korean Patent Application No. 10-2023-0115314, filed on Aug. 31, 2023, which is hereby incorporated by reference as if fully set forth herein.

TECHNICAL FIELD

The present disclosure relates to an autonomous vehicle and a control method thereof.

BACKGROUND

Autonomous vehicles, which may reduce driver fatigue by performing driving, braking, and steering on behalf of the driver, are recently required to have the ability to adaptively respond to a surrounding situation that changes in real time while driving.

An autonomous vehicle has at least one autonomous driving function.

For example, an autonomous driving function that recognizes a vehicle behind on other lanes (or in a blind spot) to avoid a collision requires a high degree of accuracy in target recognition of side and rear radar sensors (or blind spot radar sensors).

A typical autonomous vehicle uses the autonomous driving function to recognize a vehicle in a blind spot using only a blind spot radar sensor, but there may be a limited situation where intermittent diffused reflections of the radar sensor depending on driving/parking environments and obstacle states prevent the recognition of a target vehicle among a plurality of vehicles in a blind spot.

In addition, even when the typical autonomous vehicle recognizes the target vehicle, there may be errors in the accurate position and heading angle of the target vehicle.

SUMMARY

The present disclosure relates to an autonomous vehicle and a control method thereof and, more particularly, to an autonomous vehicle and a control method thereof for robustness of an autonomous driving function by controlling at least one sensor to complement each other to recognize a target vehicle present behind on other lanes.

Some embodiments of the present disclosure can provide an autonomous vehicle and its control method that may secure the robustness of an autonomous driving function by using a camera configured to recognize the rear and sides (also referred to herein as a blind spot) along with a side and rear radar sensor (or a blind spot radar sensor) and varying their priorities according to a driving environment while using them.

Embodiments and advantages of the present disclosure are not limited to those described above, and other technical features not described above may also be clearly understood by those skilled in the art from the following description.

To solve the foregoing technical problems, according to an embodiment of the present disclosure, a method of controlling an autonomous vehicle can include, such as under control of a processor, determining whether a lane line of a driving road is recognized by receiving sensing information from a plurality of sensors, initially recognizing a target vehicle driving behind on another lane based on a result of the determining, and secondly recognizing the target vehicle by varying priorities of the plurality of sensors based on an environment of a road on which the initially recognized target vehicle is driving.

In an embodiment of the present disclosure, the secondly recognizing of the target vehicle can include, under the control of the processor, setting a determination weight differently based on an error rate for each of the plurality of sensors.

In an embodiment of the present disclosure, the method can further include, in response to the lane line of the driving road not being recognized, generating at least one virtual lane line based on a driving trajectory of the autonomous vehicle, wherein the at least one virtual lane line can include a line of a lane along which the autonomous vehicle is driving and a line of a neighboring lane.

In an embodiment of the present disclosure, the method can further include determining a lateral position and a heading angle of the target vehicle based on outer sides of front/rear tires of the target vehicle and a distance between the target vehicle and the lane line of the road or between the target vehicle and the virtual lane line, and recognizing the target vehicle based on a result of the calculating.

In an embodiment of the present disclosure, the environment of the road can include a first environment that is a normal road environment, a second environment that is a dark road environment, and a third environment that is a heavy rain/heavy snow or diffusely reflected road environment.

In an embodiment of the present disclosure, the secondly recognizing of the target vehicle can include, under the control of the processor, in a case of the first environment, secondly recognizing the target vehicle by operating the plurality of sensors on a same priority.

In an embodiment of the present disclosure, the secondly recognizing of the target vehicle can include, under the control of the processor, in a case of the second environment, secondly recognizing the target vehicle by operating a radar on a first priority among the plurality of sensors.

In an embodiment of the present disclosure, the secondly recognizing of the target vehicle can include, under the control of the processor, in a case of the third environment, secondly recognizing the target vehicle by operating a camera on a first priority among the plurality of sensors.

In an embodiment of the present disclosure, the method can further include under the control of the processor, calculating a position of the target vehicle based on a set determination weight.

According to an embodiment of the present disclosure, there can be a non-transitory computer-readable storage medium storing instructions that, when executed by a processor, can cause the processor to perform the method of controlling the autonomous vehicle.

To solve the foregoing technical problems, according to an embodiment of the present disclosure, an autonomous vehicle can include a processor, wherein the processor can be configured to determine whether a lane line of a driving road is recognized by receiving sensing information from a plurality of sensors, initially recognize a target vehicle driving behind on another lane based on a result of the determining, and secondly recognize the target vehicle by varying priorities of the plurality of sensors based on an environment of a road on which the initially recognized target vehicle is driving.

In a vehicle of an embodiment of the present disclosure, the processor can be configured to, for secondly recognizing the target vehicle, set a determination weight differently based on an error rate for each of the plurality of sensors.

In a vehicle of an embodiment of the present disclosure, the processor can be further configured to, in response that the lane line of the driving road is not recognized, generate at least one virtual lane line based on a driving trajectory of the autonomous vehicle, where the at least one virtual lane includes a line of a lane along which the autonomous vehicle is driving and a line of a neighboring lane.

In a vehicle of an embodiment of the present disclosure, the processor can be further configured to calculate a lateral position of the target vehicle and a heading angle of the target vehicle, based on an outer side of front/rear tires of the target vehicle and a distance between the target vehicle and the lane line of the road or between the target vehicle and the virtual lane line, and recognize the target vehicle based on a result of the calculating.

In a vehicle of an embodiment of the present disclosure, the environment of the road can include a first environment that is a normal road environment, a second environment that is a dark road environment, and a third environment that is a heavy rain/heavy snow or diffusely reflected road environment.

In a vehicle of an embodiment of the present disclosure, the processor can be further configured to, in a case of the first environment, secondly recognize the target vehicle by operating the plurality of sensors on a same priority.

In a vehicle of an embodiment of the present disclosure, the processor can be further configured to, in a case of the second environment, secondly recognize the target vehicle by operating a radar on a first priority among the plurality of sensors.

In a vehicle of an embodiment of the present disclosure, the processor can be further configured to, in a case of the third environment, secondly recognize the target vehicle by operating a camera on a first priority among the plurality of sensors.

In a vehicle of an embodiment of the present disclosure, the processor can be further configured to calculate a position of the target vehicle based on a set determination weight.

According to an embodiment of the present disclosure, an autonomous vehicle and its control method may secure the robustness of an autonomous driving function by using a camera configured to recognize a blind spot along with a blind spot radar sensor and varying their priorities according to a driving environment while using them.

According to an embodiment of the present disclosure, an autonomous vehicle and its control method may recognize the presence or absence of a target vehicle behind on other lanes using a rear camera and a digital side mirror (DSM) having a different recognition method from that of the radar sensor to increase the performance in recognizing the target vehicle, and complement the recognition of a position, a heading angle, and the like of the target vehicle to improve the performance in recognition and control.

According to an embodiment of the present disclosure, an autonomous vehicle and its control method may improve the performance in recognition by varying the priorities according to a driving environment while using a camera configured to recognize the blind spot along with the blind spot radar sensor, thereby improving an unnecessary warning for a misrecognized false target vehicle and a risk of nonrecognition of a target vehicle.

According to an embodiment of the present disclosure, an autonomous vehicle and its control method may generate a virtual lane line using the camera, and based on the generated virtual lane line, increase the positional accuracy for a target vehicle running behind on other lanes, suppress an unnecessary operation, and improve a limited condition for using the radar sensor.

According to an embodiment of the present disclosure, an autonomous vehicle and its control method may additionally use a camera having a different recognition method from that of a radar sensor to complement their different limited situations and advantages and disadvantages, thereby improving the performance in recognition, warning, and control.

According to an embodiment of the present disclosure, an autonomous vehicle and its control method may additionally use a camera having a different recognition method from that of a radar sensor to complement their different limited situations and advantages and disadvantages, thereby preventing erroneous warning and control due to false recognition or misrecognition of a target.

According to an embodiment of the present disclosure, an autonomous vehicle and its control method may, when the operation of sensors is limited by a driving environment, ease a limitation on the driving environment through the sensors with different recognition methods to use the autonomous driving function more accurately.

Advantages that can be achieved by some embodiments of the present disclosure are not limited to those described above, and other advantages not described above may also be achieved by some embodiments of the present disclosure, as can be understood by those skilled in the art from the following description.

BRIEF DESCRIPTION OF THE DRAWINGS

FIG. 4 is a diagram illustrating an example of recognizing a target vehicle by varying priorities of a plurality of sensors under the control of a processor according to an embodiment of the present disclosure.

FIG. 6 is a diagram illustrating an example of differently setting a determination weight based on an error rate for each of a plurality of sensors under the control of a processor according to an embodiment of the present disclosure.

DETAILED DESCRIPTION OF ILLUSTRATIVE EMBODIMENTS

Figure 1:
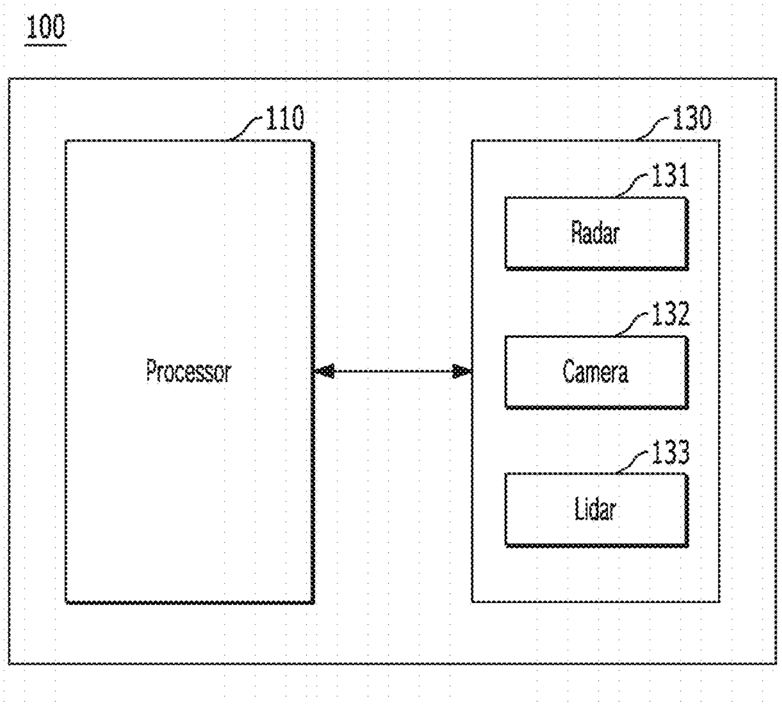
FIG. 1 is a block diagram illustrating an autonomous vehicle according to an embodiment of the present disclosure.

Hereinafter, some example embodiments of the present disclosure will be described in detail with reference to the accompanying drawings, and same or similar elements can be given same reference numerals regardless of reference symbols, and a repeated description thereof can be omitted. Further, in describing the embodiments, when it is determined that a detailed description of related publicly known technology may obscure the gist of the embodiments described herein, the detailed description thereof may be omitted.

As used herein, the terms "include," "comprise," and "have" specify the presence of stated elements, components, and/or combinations thereof, but do not preclude the presence or addition of one or more other elements, components, and/or combinations thereof. In addition, when describing the example embodiments with reference to the accompanying drawings, like reference numerals can refer to like components and a repeated description related thereto may be omitted.

In addition, the terms "unit" and "control unit" included in names such as a vehicle control unit (VCU) may be terms widely used in the naming of a control device or controller configured to control vehicle-specific functions but may not be a term that represents a generic function unit. For example, each controller or control unit may include a communication device that communicates with other controllers or sensors to control a corresponding function, a memory that stores an operating system (OS) or logic commands and input/output information, and at least one processor that performs determination, calculation, selection, and the like necessary to control the function.

FIG. 1 is a block diagram illustrating an autonomous vehicle according to an embodiment of the present disclosure.

Referring to FIG. 1, an autonomous vehicle 100 of an embodiment of the present disclosure may include a processor 110 and a plurality of sensors 130.

The plurality of sensors 130 may be provided in the autonomous vehicle 100 or mounted on the front, rear, and sides of the autonomous vehicle 100. The plurality of sensors 130 may sense in real time the surroundings of the autonomous vehicle 100 while the autonomous vehicle 100 is parked or driving and provide sensing information to the processor 110.

For example, the sensors 130 may include a radar 131, a camera 132, and a light detection and ranging sensor or lidar 133. The radar 131 may also be referred to herein as a first sensor, the camera 132 may also be referred to herein as a second sensor, and the lidar 133 may also be referred to herein as a third sensor.

The radar 131 may be provided as one or more radars in the autonomous vehicle 100. The radar 131 may measure a relative speed and a relative distance with respect to a recognized object, together with a wheel speed sensor (not shown) mounted on the autonomous vehicle 100. For example, the radar 131 may be mounted at the rear and/or on the sides of the autonomous vehicle 100 to recognize an object behind (also referred to herein as a rear object). The rear object described herein may include a rear vehicle, a rear target vehicle, a target vehicle, and the like.

The camera 132 may be provided as one or more cameras in the autonomous vehicle 100. The camera 132 may include, for example, a wide-angle camera. The camera 132 may capture images of objects present around the autonomous vehicle 100 and their states, and output image data based on the captured information. For example, the camera 132 may be mounted at the rear or on the sides of the autonomous vehicle 100 to recognize objects present behind or on the sides of the autonomous vehicle 100. This will be described in detail below.

The lidar 133 may be provided as one or more lidars in the autonomous vehicle 100. The lidar 133 may irradiate a laser pulse to an object, measure a time at which the laser pulse reflected from the object within a measurement range returns, sense information such as a distance to the object, a direction and speed of the object, and the like, and output lidar data based on the sensed information. The object described herein may be an obstacle, a vehicle, a person, a thing, and the like, present outside the autonomous vehicle 100.

The processor 110 may receive the sensing information from the plurality of sensors 130, determine whether a lane line of a road on which the autonomous vehicle 100 is driving is recognized, and initially recognize a target vehicle driving behind or on sides based on a result of the determining.

The processor 110 may secondly recognize the initially recognized target vehicle by varying the priorities of the plurality of sensors 130 based on an environment of a road on which the initially recognized target vehicle is driving, and set a determination weight differently based on the secondly recognized target vehicle. For example, the processor 110 may perform sensing using the first sensor 131 and the second sensor 132 on substantially the same priority according to the environment of the road.

Alternatively, the processor 110 may perform sensing using the first sensor 131 preferentially over the second sensor 132 according to the environment of the road. Alternatively, the processor 110 may perform sensing using the second sensor 132 preferentially over the first sensor 131 according to the environment of the road. This will be described in detail below.

Figure 2A:
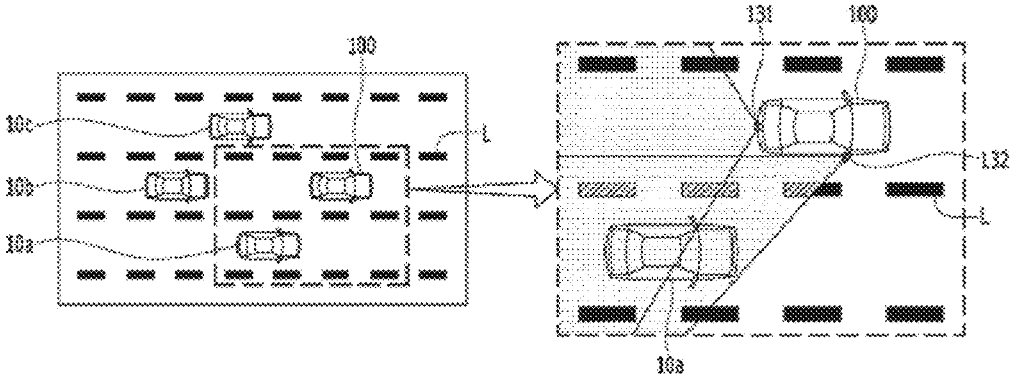
FIGS. 2A and 2B are diagrams illustrating examples of generating a virtual lane line under the control of a processor according to an embodiment of the present disclosure.
Figure 2B:
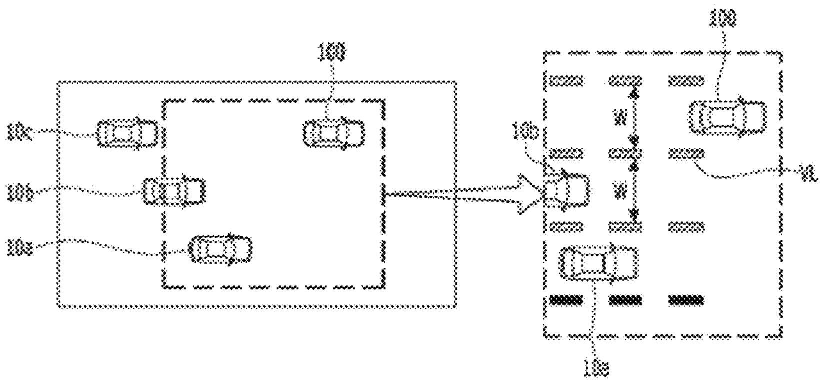

FIGS. 2A and 2B are diagrams illustrating examples of generating a virtual lane line under the control of a processor according to an embodiment of the present disclosure.

Referring to FIGS. 2A and 2B, the processor 110 of an embodiment of the present disclosure may determine whether a lane line of a driving road is recognized based on sensing information provided by the plurality of sensors 130.

The processor 110 may determine whether a lane line of a road on which an ego vehicle (e.g., the autonomous vehicle 100) is driving is recognized or not based on sensing information provided by the first sensor 131 and the second sensor 132.

Referring to FIG. 2A, when it is determined that the lane line of the road is recognized, the processor 110 may recognize one or more rear vehicles 10*a*, 10*b*, and 10*c* driving behind or on the sides of the ego vehicle 100 based on the recognized lane lines. The processor 110 may initially recognize the rear vehicles 10*a*, 10*b*, and 10*c*, and set one of the initially recognized vehicles 10*a*, 10*b*, and 10*c* as a target vehicle (e.g., 10*a*).

In contrast, referring to FIG. 2B, when it is determined that the lane line of the road is not recognized, the processor 110 may generate a virtual lane line VL based on a driving lane. For example, when the lane line of the driving road is not recognized, the processor 110 may generate the virtual lane line VL based on a driving trajectory of the ego vehicle 100.

For example, when a lane line L is not present or is not recognized, the processor 110 may receive sensing information recognized by a rear/side camera and generate a virtual lane line VL to improve the accuracy of a position of the target vehicle 10*a* present behind or on the sides. In such example case, the sensing information may include lane line information.

Because the target vehicle 10*a* is located behind or on the sides due to the nature of a blind-spot collision-avoidance assist (BCA) function, the processor 110 may generate the virtual lane line VL by storing and calculating a lane line behind the ego vehicle 100 or a trajectory along which the ego vehicle 100 has driven.

In such example case, the virtual lane line VL may include a line of a lane (ego lane) along which the ego vehicle 100 is driving and a line of a neighboring lane adjacent to the ego lane. The line of the neighboring lane may include all lines that neighbor on both sides of the ego lane.

As described above, when the lane line is not recognized, the processor 110 may define and store, as a center of the lane, the trajectory along which the ego vehicle 100 has driven and may determine, as a default, the virtual lane line VL from the ego vehicle 100 up to both the side lanes of the ego vehicle 100.

The processor 110 may set a width W as a lane width for the virtual lane lines VL generated based on the ego vehicle 100 or the target vehicle 10*a* to be approximately 2.7 meters (m) or more and 3.3 m or less, which is typically the minimum width of a lane of a general road (in some countries and/or for some types of roads). When the width of the virtual lane is approximately 2.7 m or less, large vehicles, such as large sport utility vehicles (SUVs), trucks, and buses, may experience great inconvenience in driving within the width of the virtual lane. In addition, when the width of virtual lane is approximately 3.3 m or more, there may be no inconvenience for vehicles to drive, but the number of lanes may be relatively small for a general road with a limited width. Based on this, it may be desirable to set the width of the virtual lane to be approximately 3 m.

In this example case, the curvature of a lane line may follow the driving trajectory of the ego vehicle 100 under the control of the processor 110.

Figure 3:
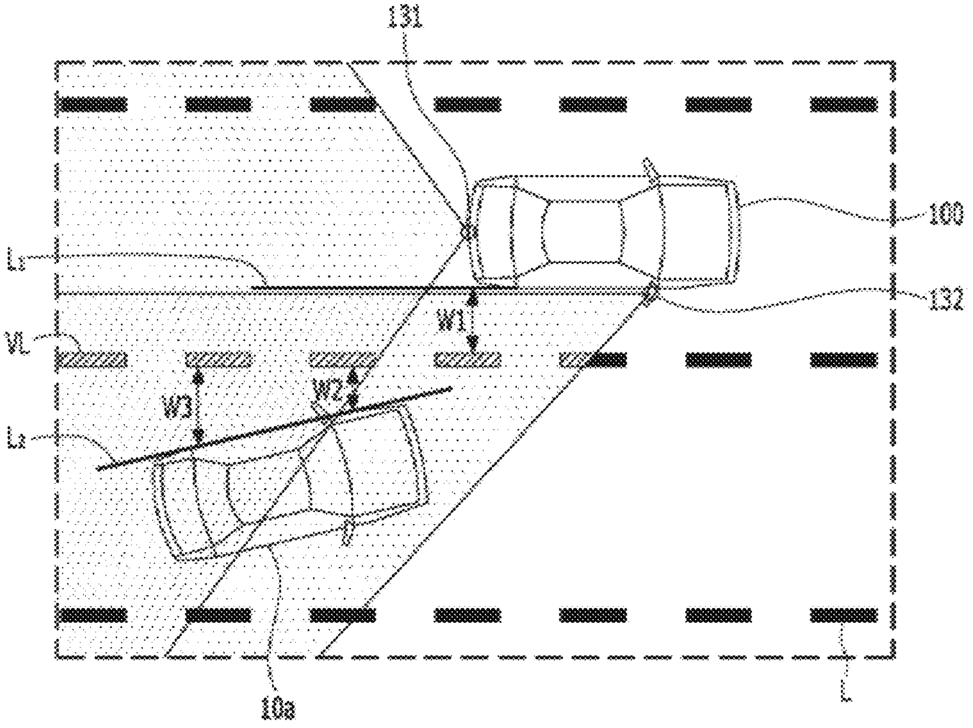
FIG. 3 is a diagram illustrating an example of determining a position of a target vehicle using a virtual lane line under the control of a processor according to an embodiment of the present disclosure.

FIG. 3 is a diagram illustrating an example of determining a position of a target vehicle using a virtual lane line VL under the control of a processor according to an embodiment of the present disclosure.

Referring to FIG. 3, according to an embodiment of the present disclosure, the processor 110 may initially recognize a target vehicle 10*a* based on sensing information provided by the plurality of sensors 130.

The processor 110 may calculate a lateral position of the target vehicle 10*a* and a heading angle of the target vehicle 10*a*, based on an outer side of front/rear tires of the target vehicle 10*a* recognized based on the sensing information and a distance between the target vehicle 10*a* and a lane line of a road or between the target vehicle 10*a* and a virtual lane line VL.

Accordingly, the autonomous vehicle 100 may more accurately recognize the target vehicle 10*a* under the control of the processor 110. The autonomous vehicle 100 may also be referred to herein as an ego vehicle 100.

For example, the processor 110 may calculate the lateral position of the target vehicle 10*a* and the heading angle of the target vehicle 10*a* by receiving the sensing information and analyzing a distance W1 between the ego vehicle 100 and the virtual lane line VL, distances W2 and W3 between outer sides of the front/rear tires of the target vehicle 10*a* and the virtual lane line VL, a distance between the ego vehicle 100 and a lane line, distances between the outer sides of the front/rear tires of the target vehicle 10*a* and the lane line, and the like.

The lateral position of the target vehicle 10*a* and the heading angle of the target vehicle 10*a* may need to be calculated because there may be a probability that there is an error in a position of the target vehicle 10*a* in the sensing information provided by a camera.

Accordingly, the processor 110 may generate a virtual lane line VL, analyze a distance between the generated virtual lane line VL and the recognized target vehicle 10*a*, and calculate a lateral position of the target vehicle 10*a* and a heading angle of the target vehicle 10*a* based on a result of the analysis, thereby recognizing a position of the target vehicle 10*a* more accurately.

FIG. 4 is a diagram illustrating an example of recognizing a target vehicle by varying priorities of a plurality of sensors under the control of a processor according to an embodiment of the present disclosure.

Referring to FIG. 4, the processor 110 may control to secondly recognize a target vehicle 10*a* by varying the priorities of the plurality of sensors 130 based on an environment of a road on which the initially recognized target vehicle 10*a* is driving.

In this example case, an environment of a road (also referred to herein as a road environment) may include a first environment, a second environment, and a third environment.

The first environment may be a normal road environment. The first environment may refer to an environment where a driving road is in a normal state. In the case of the first environment, the processor 110 may control to operate the plurality of sensors 130 on the same priority to secondly recognize the target vehicle 10*a*.

For example, in a driving road environment in a normal state without any problem with the recognition by each sensor, when a side and rear radar and camera satisfies the recognition of the target vehicle 10*a* or lane line, the processor 110 may determine the presence of the target vehicle 10*a* or the lane line.

In the case of the first environment, the processor 110 may analyze sensing information provided by the first sensor 131 to calculate a longitudinal position of the target vehicle 10*a* and a speed of the target vehicle 10*a*. The first sensor 131 may be a radar.

For the longitudinal position and speed of the target vehicle 10*a*, a recognition value of the side and rear radar having a relatively high accuracy in recognizing a moving object may be set as a first priority, under the control of the processor 110.

In the case of the first environment, the processor 110 may analyze sensing information provided by the second sensor 132 to calculate a lateral position of the target vehicle 10*a* and a heading angle of the target vehicle 10*a*. The second sensor 132 may be a camera.

For the lateral position and heading angle of the target vehicle 10*a*, a recognition value of the camera calculated by the camera based on a distance between the target vehicle 10*a* and a lane line may be set as a first priority, under the control of the processor 110.

The second environment may be a dark road environment. The second environment may refer to an environment where a driving road is in a dark state at night. In the case of the second environment, the processor 110 may control the radar, which is the first sensor 131 among the plurality of sensors 130, to operate on the first priority to secondly recognize the target vehicle 10*a*. In this example case, the camera, which is the second sensor 132, may not be able to recognize the target vehicle 10*a* and lane lines in the dark road environment, which is the second environment, or even if the camera recognizes the target vehicle 10*a* and the lane lines, it may have a significantly reduced accuracy in sensing. Accordingly, the processor 110 may control the first sensor 131 to operate preferentially over the second sensor 132 in the second environment. When the recognition of both the target vehicle 10*a* and lane lines by the camera is limited, as in the dark road state at night, the processor 110 may operate the function using the side and rear radar.

In the case of the second environment, the processor 110 may analyze sensing information provided by the first sensor 131 to calculate the longitudinal position of the target vehicle 10*a*, the speed of the target vehicle 10*a*, the lateral position of the target vehicle 10*a*, and the heading angle of the target vehicle 10*a*.

When lane line recognition by the camera is limited, for example, when there is no lane line or lane lines are not normally visible, the processor 110 may determine the lateral position and the heading angle of the target vehicle 10*a* by using a recognition value of the side and rear radar preferentially.

The third environment may be a heavy rain/snow or diffusely reflected road environment. The third environment may refer to an environment where there is a diffused reflection on a road or where it rains/snows heavily on the road.

In the case of the third environment, the processor 110 may control the camera, which is the second sensor 132 among the plurality of sensors 130, to operate on the first priority to secondly recognize the target vehicle 10*a*. In this example case, the radar, which is the first sensor 131, may not be able to recognize the target vehicle 10*a* and lane lines in the heavy rain/snow or diffusely reflected road environment, which is the third environment, or even if the radar recognizes the target vehicle 10*a* and lane lines, it may have a significantly reduced accuracy in sensing. Accordingly, the processor 110 may control the second sensor 132 to operate preferentially over the first sensor 131 in the third environment. When the recognition by the side and rear radar is limited due to heavy rain, heavy snow, and the like, the processor 110 may operate the function using the camera.

In the case of the third environment, the processor 110 may analyze sensing information provided by the second sensor 132 to calculate the longitudinal position of the target vehicle 10*a*, the speed of the target vehicle 10*a*, the lateral position of the target vehicle 10*a*, and the heading angle of the target vehicle 10*a*. When the recognition by the side and rear radar is limited due to heavy rain, heavy snow, and the like, the processor 110 may determine the longitudinal position of the target vehicle 10*a* and the speed of the target vehicle 10*a* by using a recognition value of the camera preferentially.

Figure 5A:
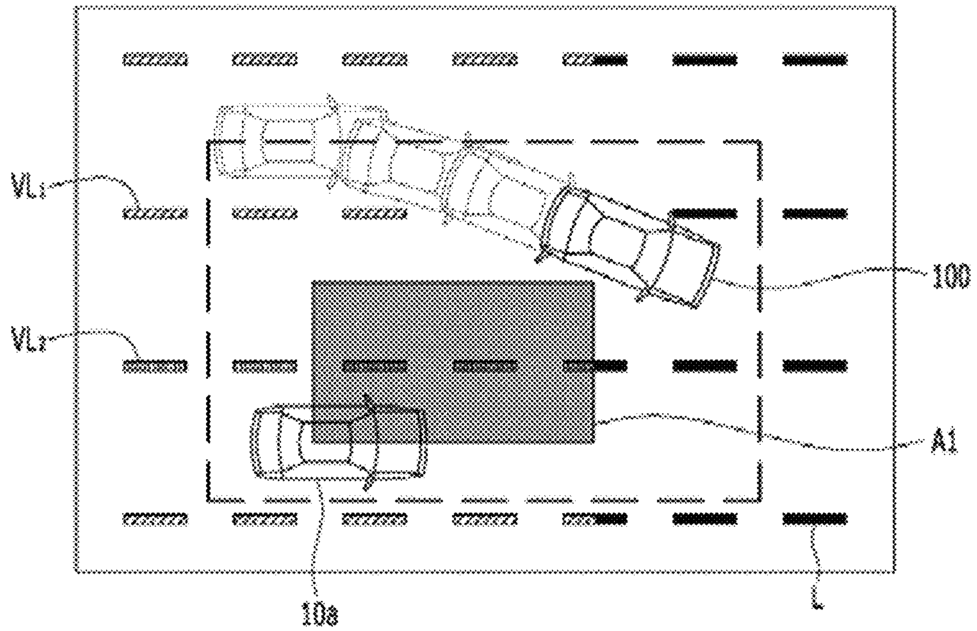
FIGS. 5A and 5B are diagrams illustrating warning areas according to an embodiment of the present disclosure.
Figure 5B:
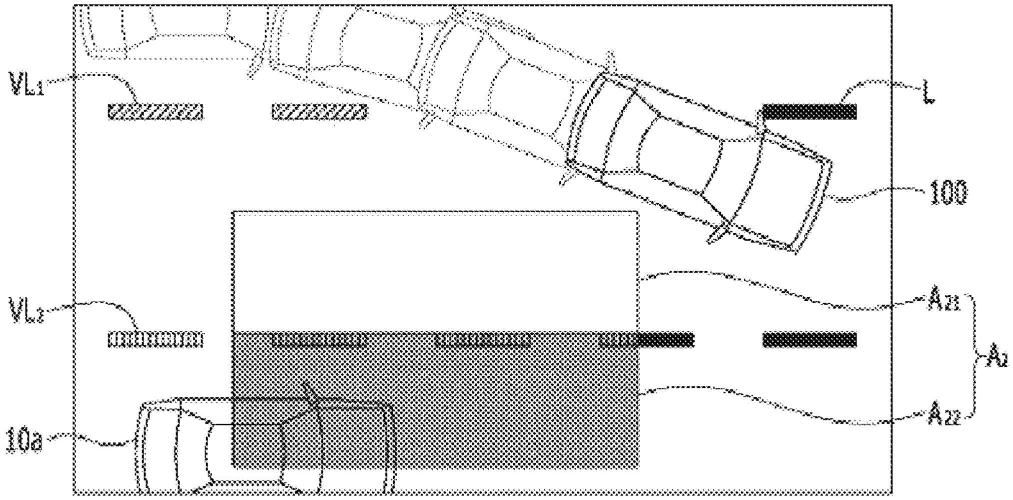

FIGS. 5A and 5B are diagrams illustrating warning areas according to an embodiment of the present disclosure.

Referring to FIGS. 5A and 5B, the processor 110 may generate a virtual lane line VL by using sensing information provided through the plurality of sensors 130. The virtual lane line VL may include a line of an ego lane along which the ego vehicle 100 is driving, a line of a neighboring lane, and a line of a lane next to the neighboring lane.

Referring to FIG. 5A, a typical autonomous vehicle may determine an entry when an outer side of tires of a target vehicle 10*a* enters a neighboring lane on the side and may be operated based on a warning area A1 regardless of a lane, thereby activating an unnecessary warning/control.

In contrast, referring to FIG. 5B, under the control of the processor 110, the autonomous vehicle 100 according to an embodiment of the present disclosure may not activate the unnecessary warning/control due to the target vehicle 10*a* on a lane next to a neighboring lane before it completely enters the neighboring lane on the side during a lane change to the neighboring lane.

The processor 110 may divide a warning area A2 into a first area A21 and a second area A22 based on a line of a neighboring lane, which is a generated virtual lane line VL, and may not activate the unnecessary warning/control due to the target vehicle 10*a* on a lane next to the neighboring lane before it completely enters the neighboring lane when it changes the lane to the neighboring lane.

In this example case, the first area A21 may be a warning area where a warning is to be activated, and the second area A22 may be a non-warning area where no warning is to be activated.

FIG. 6 is a diagram illustrating an example of setting a determination weight differently based on an error rate for each of a plurality of sensors under the control of a processor according to an embodiment of the present disclosure.

Referring to FIG. 6, during the secondary recognition of a target vehicle 10*a*, the processor 110 may control to set a determination weight differently based on an error rate for each of the plurality of sensors 130.

The processor 110 may calculate a position of the target vehicle 10*a* based on the set determination weight.

For example, the processor 110 may assign different weights to the position of the target vehicle 10*a* during sensor fusion based on error rates for longitudinal and lateral directions for each of the plurality of sensors 130. In this example case, the error rate may also be referred to as an accuracy, an accuracy rate, or an error rate ratio.

As shown in FIG. 6, each of the plurality of sensors 130 may be divided by the accuracy and measured distance based on the longitudinal direction and by the accuracy and measured distance based on the lateral direction. Based on this, the processor 110 may assign different determination weights based on sensor accuracy. For example, as shown, when the accuracy of the radar is 90% in the longitudinal direction and 60% in the lateral direction, and the accuracy of the camera is 70% in the longitudinal direction and 90% in the lateral direction, the processor 110 may calculate and determine the position of the target vehicle 10*a* as follows. In this example case, the accuracy a of the radar is 90% in the longitudinal direction, the accuracy b of the camera is 70% in the longitudinal direction, the accuracy c of the radar is 60% in the lateral direction, and the accuracy d of the camera is 90% in the lateral direction. For example, when the longitudinal position of the target vehicle 10*a* is measured at 10 m by the radar and 15 m by the camera, the processor 110 may calculate as expressed [(radar 10 m*(90/(90+70))%+camera 15 m*(70/(90+70))%)]=12.2 m.

In addition, when the lateral position of the target vehicle 10*a* is measured at 4 m by the radar and 3 m by the camera, the processor 110 may calculate as expressed [(radar 4 m*(60/(60+90))%+camera 3 m*(90/(60+90))%)]=3.4 m.

Figure 7:
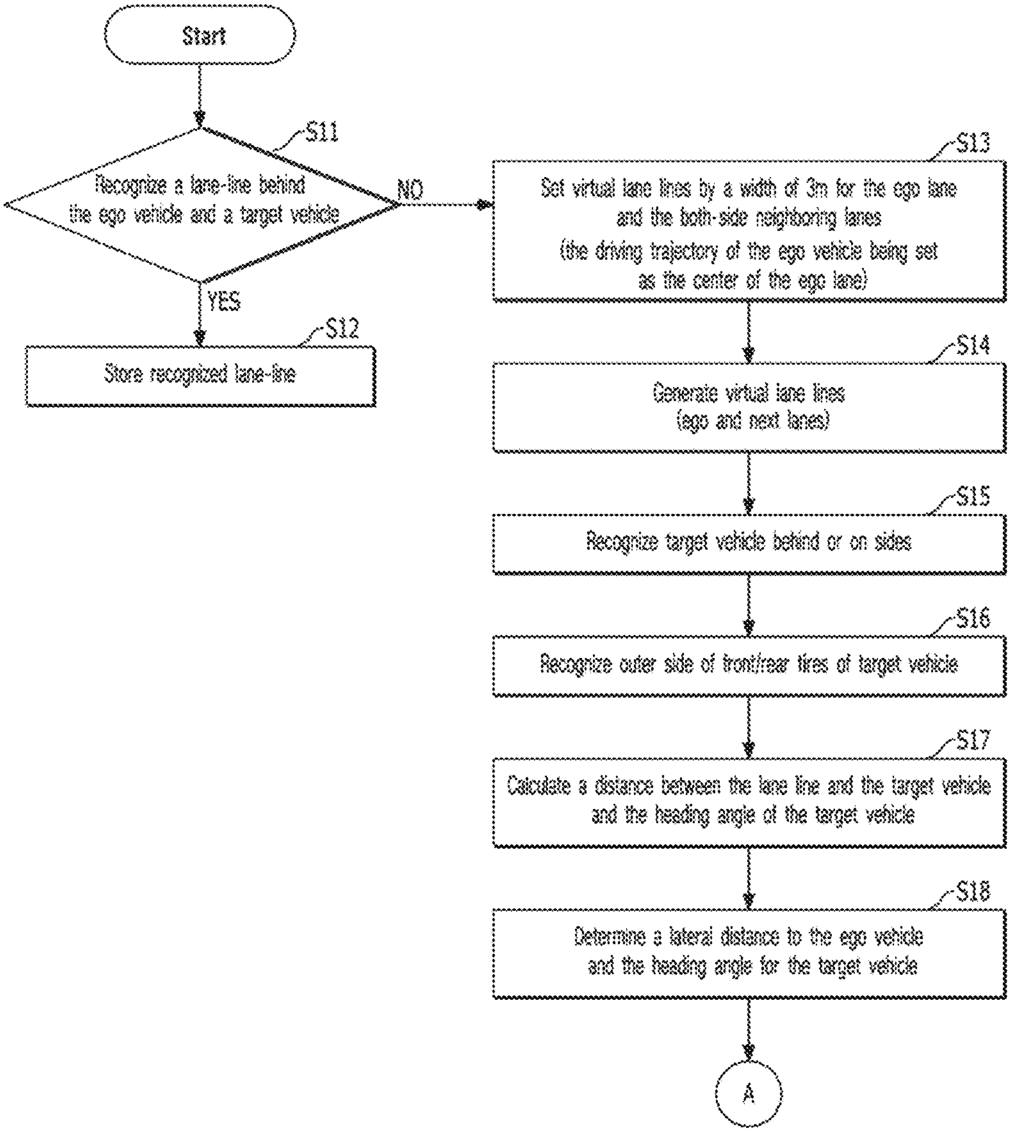
FIGS. 7 to 9 are flowcharts illustrating a method of controlling an autonomous vehicle according to an embodiment of the present disclosure.
Figure 8:
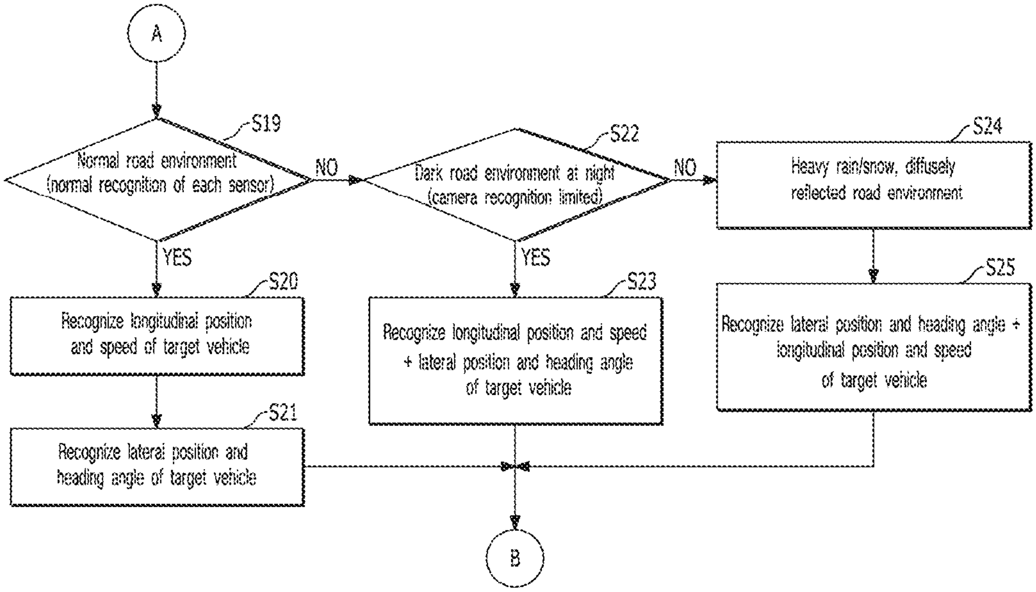
Figure 9:
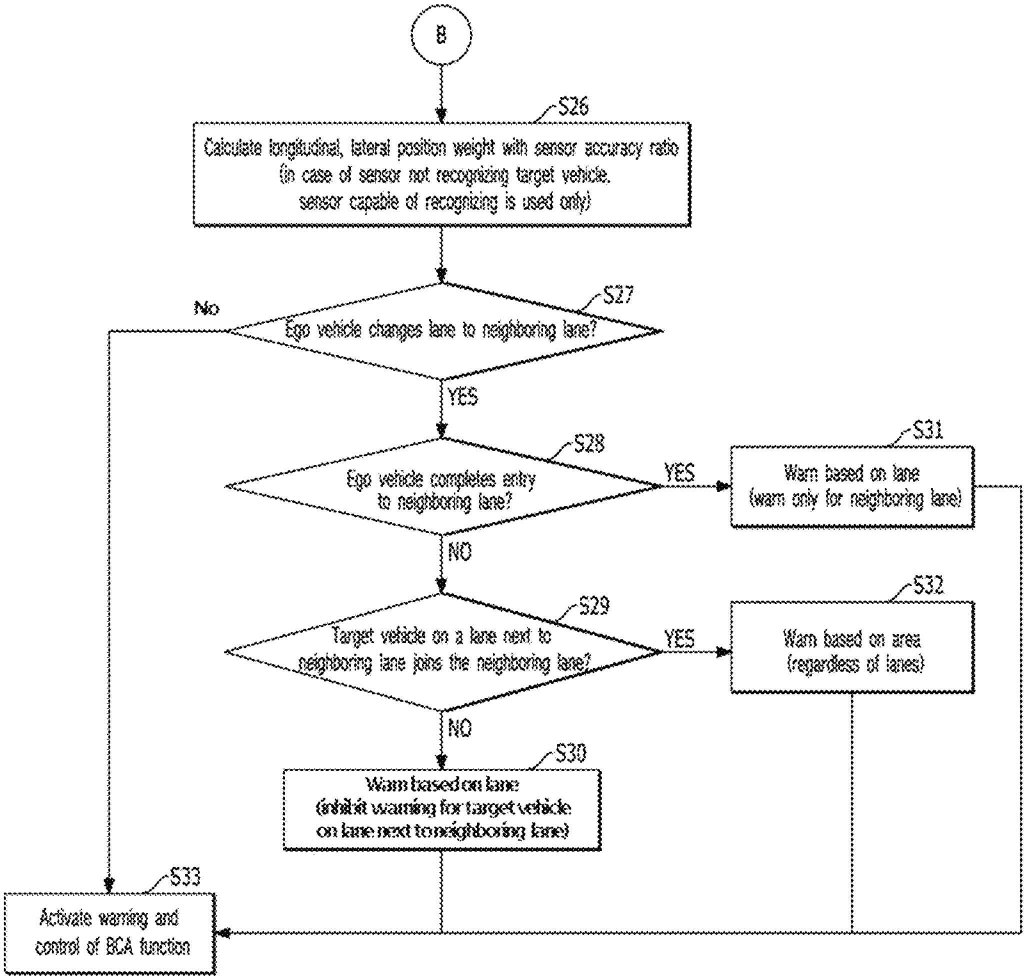

FIGS. 7 to 9 are flowcharts illustrating a method of controlling an autonomous vehicle according to an embodiment of the present disclosure.

Referring to FIGS. 7 to 9, a method of controlling an autonomous vehicle according to an embodiment of the present disclosure is as follows.

In operation S11, the processor 110 may receive sensing information from the plurality of sensors 130 and determine whether a lane line of a driving road is recognized.

In operation S12, when the lane line of the driving road or a line of the lane is recognized, the processor 110 may store the recognized lane of the road or the recognized line of the lane.

In operation S13, when the lane of the driving road or the line of the lane is not recognized, the processor 110 may set a virtual lane line VL including the driving lane and a neighboring lane next to the driving lane.

In operation S14, the processor 110 may generate the virtual lane line VL based on a driving trajectory of the ego vehicle 100.

When the lane line of the driving road is not recognizable, the processor 110 may generate the virtual lane line VL based on the driving trajectory along which the ego vehicle 100 has driven. In this example case, the virtual lane line VL may include a line of an ego lane along which the ego vehicle 100 is driving and a line of a neighboring lane adjacent to the ego lane. This has been described in detail above, and a more detailed description thereof will be omitted here.

In operation S15, the processor 110 may initially recognize a target vehicle 10*a* driving behind or on the sides, based on the generated virtual lane line VL.

The processor 110 may recognize an outer side of front/rear tires of the target vehicle 10*a* in operation S16, calculate a lateral position of the target vehicle 10*a* and a heading angle of the target vehicle 10*a* based on a distance between the target vehicle 10*a* and the lane line of the road or between the target vehicle 10*a* and the virtual lane line VL in operation S17, and determine a position of the target vehicle 10*a* based on this in operation S18.

The processor 110 may secondly recognize the target vehicle 10*a* by varying the priorities of the plurality of sensors 130 based on an environment of a road on which the initially recognized target vehicle 10*a* is driving.

When the processor 110 is in a normal driving road environment where there is no problem with the recognition of each sensor in operation S19, the processor 110 may calculate a longitudinal position of the target vehicle 10*a* and a speed of the target vehicle 10*a* by analyzing sensing information provided by the first sensor 131 in operation S20, and calculate the lateral position of the target vehicle 10*a* and the heading angle of the target vehicle 10*a* by analyzing sensing information provided by the second sensor 132 in operation S21.

When the recognition of both the target vehicle 10*a* and the lane line by the camera is limited in a dark road environment at night, which is not in the normal road environment, in operation S22, the processor 110 may calculate the longitudinal position of the target vehicle 10*a*, the speed of the target vehicle 10*a*, the lateral position of the target vehicle 10*a*, and the heading angle of the target vehicle 10*a* by analyzing sensing information provided by the side and rear radar in operation S23.

When the recognition by the side and rear radar is limited in a diffusely reflected road environment or a heavy rain/snow environment in operation S24, the processor 110 may determine the longitudinal position of the target vehicle 10*a*, the speed of the target vehicle 10*a*, the lateral position of the target vehicle 10*a*, and the heading angle of the target vehicle 10*a* by analyzing sensing information provided by the camera in operation S25.

Subsequently, in operation S26, the processor 110 may assign a weight differently to the position of the target vehicle 10*a* during sensor fusion based on an error rate for each of the longitudinal and lateral directions for each of the plurality of sensors 130. This has been described in detail above with reference to FIG. 6, and a more detailed description thereof will be omitted here.

In operation S27, the processor 110 may determine whether the ego vehicle 100 has changed to a neighboring lane on the side.

In operation S33, when the ego vehicle 100 has not changed to the neighboring lane as the result of the determination, the processor 110 may operate warning and control of a behavioral competence assessment (BCA) function.

When the ego vehicle 100 has changed to the neighboring lane and completes an entry in operation S28, the processor 110 may activate a warning based on a lane in operation S31.

When the ego vehicle 100 has changed to the neighboring lane but does not complete the entry, the processor 110 may determine whether the target vehicle 10*a* driving on a lane next to the neighboring lane joins the neighboring lane in operation S29.

When it is determined that the target vehicle 10*a* driving on the lane next to the neighboring lane has joined the neighboring lane, the processor 110 may activate a warning based on an area in operation S32. In this example case, the processor 110 may warn the target vehicle 10*a* regardless of the lane.

When it is determined that the target vehicle 10*a* driving on the lane next to the neighboring lane has not joined the neighboring lane, the processor 110 may activate a warning based on a lane in operation S30. Accordingly, the warning for the target vehicle 10*a* driving on the lane next to the neighboring lane may be inhibited.

The embodiments of the present disclosure described herein may be implemented as computer-readable code on a medium in which a program is recorded. The computer-readable medium may include all types of recording devices that store data to be read by a computer system. The computer-readable medium may include, for example, a hard disk drive (HDD), a solid-state drive (SSD), a silicon disk drive (SDD), a read-only memory (ROM), a random-access memory (RAM), a compact disc ROM (CD-ROM), a magnetic tape, a floppy disk, an optical data storage device, and the like.

Accordingly, the foregoing detailed description should not be construed as restrictive but as illustrative in all respects. The scopes of possible embodiments of the present disclosure should be determined by reasonable interpretation of the appended claims, and all changes and modifications within equivalent scopes of the present disclosure can be included in the scopes of the present disclosure.

What is claimed is:

1. A method of controlling an autonomous ego vehicle, the method comprising:

generating a virtual lane line based on sensing information received from a plurality of sensors including a first sensor and a second sensor having a different type from the first sensor, and based on a driving trajectory of the ego vehicle;

determining at least one vehicle, among vehicles driving behind the ego vehicle, as a target vehicle based on the virtual lane line;

determining priorities of the first sensor and the second sensor based on an environment of a road on which the target vehicle is driving;

generating driving information of the target vehicle based on sensing information of at least one of the first sensor or the second sensor according to the priorities; and controlling the ego vehicle to avoid a collision with the target vehicle based on the driving information of the target vehicle.

2. The method of claim 1, wherein the first sensor is a radar, and wherein the second sensor is a camera.

3. The method of claim 2, further comprising:

determining, based on sensing information of the second sensor, a lateral position of the target vehicle and a heading angle of the target vehicle, wherein the determining of the lateral position and the heading angle of the target vehicle are based on outer sides of front and rear tires of the target vehicle and a first distance between the target vehicle and a lane line of the road or a second distance between the target vehicle and the virtual lane line.

4. The method of claim 2, wherein the environment of the road on which the target vehicle is driving includes:

a first environment that is a normal road environment, a second environment that is a dark road environment, or a third environment that is a heavy rain/heavy snow or diffusely reflected road environment.

5. The method of claim 4, wherein, in a case of the first environment, the priorities of the first sensor and the second sensor are determined to be equal.

6. The method of claim 4, wherein, in a case of the second environment, the first sensor is determined to have a higher priority than the second sensor.

7. The method of claim 4, wherein, in a case of the third environment, the second sensor is determined to have a higher priority than the first sensor.

8. The method of claim 1, further comprising generating the driving information of the target vehicle based on sensing information of one of the first sensor or the second sensor having a higher priority.

9. The method of claim 1, further comprising, based on the priorities being equal, generating the driving information of the target vehicle based on sensing information of both the first sensor and the second sensor.

10. The method of claim 9, wherein the first sensor is a radar and wherein the second sensor is a camera, and the method further comprises generating the driving information of the target vehicle based on a longitudinal position and a speed of the target vehicle sensed by the first sensor and based on a lateral position and a heading angle of the target vehicle sensed by the second sensor.

11. The method of claim 1, further comprising:

determining whether a lane line of the road is recognized based on the sensing information received from the plurality of sensors;

based on the lane line being recognized, generating the virtual lane line based on the sensing information received from the plurality of sensors; and based on the lane line not being recognized, generating the virtual lane line based on the driving trajectory of the ego vehicle.

12. The method of claim 1, wherein the virtual lane line includes a lane line between an ego lane along which the ego vehicle is driving and a neighboring lane adjacent to the ego lane.

13. The method of claim 1, further comprising setting a virtual lane to have a width of 2.7 meters to 3.3 meters with the driving trajectory of the ego vehicle as a center of the virtual lane.

14. The method of claim 1, wherein the driving information includes a longitudinal position and a lateral position of the target vehicle, and wherein the longitudinal position and the lateral position are generated based on accuracy of each of the first sensor and the second sensor.

15. The method of claim 1, further comprising:

determining whether the ego vehicle has completed entering a first lane by performing a lane change to the first lane adjacent in a first direction; and determining whether the target vehicle driving in a second lane adjacent to the first lane in the first direction merges into the first lane.

16. The method of claim 15, further comprising dividing a warning area based on the ego vehicle by generating the virtual lane line between the first lane and the second lane, and wherein the warning area includes a first area in the first lane and a second area in the second lane.

17. The method of claim 16, further comprising, before the ego vehicle completes entering the first lane and based on the target vehicle merging into the first lane, generating a warning based on the target vehicle being located in at least one of the first area or the second area.

18. The method of claim 16, further comprising, before the ego vehicle completes entering the first lane and based on the target vehicle not merging into the first lane, generating a warning based on the target vehicle being located in the first area, and not generating the warning based on the target vehicle being located in the second area.

19. A non-transitory computer-readable storage medium storing instructions that, by being executed by a processor, cause the processor to:

generate a virtual lane line based on sensing information received from a plurality of sensors including a first sensor and a second sensor having a different type from the first sensor, and based on a driving trajectory of an ego vehicle;

determine at least one vehicle, among vehicles driving behind the ego vehicle, as a target vehicle based on the virtual lane line;

determine priorities of the first sensor and the second sensor based on an environment of a road on which the target vehicle is driving;

generate driving information of the target vehicle based on sensing information of at least one of the first sensor or the second sensor according to the priorities; and control the ego vehicle to avoid a collision with the target vehicle based on the driving information of the target vehicle.

20. An autonomous vehicle comprising:

a plurality of sensors comprising a first sensor, and a second sensor having a different type from the first sensor, wherein the plurality of sensors are configured to sense surroundings of the autonomous vehicle;

a processor device; and a storage medium storing computer-readable instructions that, when executed by the processor device, enable the processor device to:

generate a virtual lane line based on sensing information received from the plurality of sensors and based on a driving trajectory of the autonomous vehicle, determine at least one vehicle, among vehicles driving behind the autonomous vehicle, as a target vehicle based on the virtual lane line, determine priorities of the first sensor and the second sensor based on an environment of a road on which the target vehicle is driving, generate driving information of the target vehicle based on sensing information of at least one of the first sensor or the second sensor according to the priorities, and control the autonomous vehicle to avoid a collision with the target vehicle based on the driving information of the target vehicle.

* * * * *